US010255618B2

(12) United States Patent
Santi et al.

(10) Patent No.: US 10,255,618 B2
(45) Date of Patent: Apr. 9, 2019

(54) DEEP LINK ADVERTISEMENTS

(71) Applicant: Samsung Electronics Co., Ltd., Suwon-si, Gyeonggi-do (KR)

(72) Inventors: James Delli Santi, San Jose, CA (US); Rajesh Shenoy, Cupertino, CA (US); Deepak Thrakal, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 14/975,984

(22) Filed: Dec. 21, 2015

(65) Prior Publication Data
US 2017/0178187 A1 Jun. 22, 2017

(51) Int. Cl.
*G06Q 30/00* (2012.01)
*G06Q 30/02* (2012.01)

(52) U.S. Cl.
CPC ..... *G06Q 30/0256* (2013.01); *G06Q 30/0251* (2013.01); *G06Q 30/0273* (2013.01)

(58) Field of Classification Search
CPC ........... G06Q 30/0256; G06Q 30/0273; G06Q 30/0251
USPC ...................... 705/14.49, 14.64, 14.66, 14.71
See application file for complete search history.

(56) References Cited

U.S. PATENT DOCUMENTS

| | | | | |
|---|---|---|---|---|
| 5,717,923 A * | 2/1998 | Dedrick | ............ | G06F 17/30702 |
| 5,848,396 A * | 12/1998 | Gerace | .................. | G06Q 30/02 705/7.33 |
| 5,991,735 A * | 11/1999 | Gerace | .................. | G06Q 30/02 705/7.29 |
| 7,853,700 B2 * | 12/2010 | Lee | ......................... | G06Q 30/02 705/7.29 |
| 7,962,604 B1 * | 6/2011 | Morris | .................. | G06Q 30/02 705/14.4 |
| 8,321,534 B1 * | 11/2012 | Roskind | ........... | H04N 21/25808 348/194 |
| 2001/0029525 A1 * | 10/2001 | Lahr | ................. | G06F 17/30864 709/218 |
| 2002/0042738 A1 * | 4/2002 | Srinivasan | ............. | G06Q 30/02 705/14.43 |
| 2003/0106022 A1 * | 6/2003 | Goodacre | ......... | G06F 17/30905 715/226 |
| 2005/0096979 A1 * | 5/2005 | Koningstein | .......... | G06Q 10/10 705/14.68 |

(Continued)

*Primary Examiner* — Luis A Brown
(74) *Attorney, Agent, or Firm* — Jefferson IP Law, LLP

(57) ABSTRACT

According to some implementations of the present disclosure, a method that is executed by a processing system is described. The method includes receiving an ad request, determining a context category structure based on the ad request, and identifying one or more app-specific rules based on the category defined in the context category. The method further includes, for each app-specific rule: determining whether the identified entities in the context category structure are received by the template defined in the app-specific rule; generating a function identifier based on the set of identified entities and the template when the identified entities are received by the template defined in the app-specific rule; and determining a score for each of the generated function identifiers. The method includes selecting one or more of the generated function IDs based on the respective scores of the function IDs and generating an advertisement object corresponding to the function ID.

19 Claims, 7 Drawing Sheets

(56) References Cited

U.S. PATENT DOCUMENTS

| | | | |
|---|---|---|---|
| 2005/0096980 A1* | 5/2005 | Koningstein | G06Q 30/00 705/14.41 |
| 2005/0235048 A1* | 10/2005 | Costa-Requena | H04L 29/06027 709/219 |
| 2006/0074769 A1* | 4/2006 | Looney | G06Q 30/02 705/14.66 |
| 2006/0149624 A1* | 7/2006 | Baluja | G06Q 30/0255 705/14.53 |
| 2006/0271438 A1* | 11/2006 | Shotland | G06Q 30/02 705/14.46 |
| 2007/0022442 A1* | 1/2007 | Gil | G06F 17/30905 725/62 |
| 2007/0300152 A1* | 12/2007 | Baugher | G06F 17/3089 715/210 |
| 2008/0092159 A1* | 4/2008 | Dmitriev | G06Q 30/0269 725/34 |
| 2010/0036717 A1* | 2/2010 | Trest | G06Q 30/0207 705/14.1 |
| 2010/0222040 A1* | 9/2010 | Bosan | G06Q 30/02 455/414.1 |
| 2012/0278722 A1* | 11/2012 | Raleigh | H04L 12/14 715/735 |
| 2012/0289147 A1* | 11/2012 | Raleigh | H04L 67/2847 455/3.06 |
| 2013/0337785 A1* | 12/2013 | Delug | H04W 4/60 455/414.1 |
| 2014/0250106 A1* | 9/2014 | Shapira | G06F 17/30864 707/722 |
| 2014/0316890 A1* | 10/2014 | Kagan | G06Q 30/0256 705/14.54 |
| 2015/0095160 A1* | 4/2015 | Ma | G06Q 30/0267 705/14.64 |
| 2015/0134436 A1* | 5/2015 | Lambert | G06Q 30/00 705/14.26 |
| 2015/0193546 A1* | 7/2015 | Lipton | G06F 9/445 717/178 |
| 2015/0227588 A1* | 8/2015 | Shapira | G06F 17/30675 707/722 |
| 2015/0254367 A1* | 9/2015 | Kagan | G06F 3/0482 707/706 |
| 2015/0324868 A1* | 11/2015 | Kaftan | G06F 17/30864 707/750 |
| 2015/0347585 A1* | 12/2015 | Klotz | G06F 17/30867 707/706 |
| 2015/0371263 A1* | 12/2015 | Kagan | G06Q 30/0256 705/14.54 |
| 2016/0034957 A1* | 2/2016 | Kagan | G06Q 30/0256 705/14.54 |
| 2016/0063535 A1* | 3/2016 | Xu | G06Q 30/0241 705/14.4 |
| 2016/0085521 A1* | 3/2016 | Savliwala | G06F 17/30867 717/108 |
| 2016/0092919 A1* | 3/2016 | Coleman, Jr. | G06Q 30/0255 705/14.53 |
| 2016/0162555 A1* | 6/2016 | Shapira | G06F 17/30554 707/722 |
| 2016/0313893 A1* | 10/2016 | Xu | G06F 3/0481 |
| 2017/0178187 A1* | 6/2017 | Santi | G06Q 30/0256 |

* cited by examiner

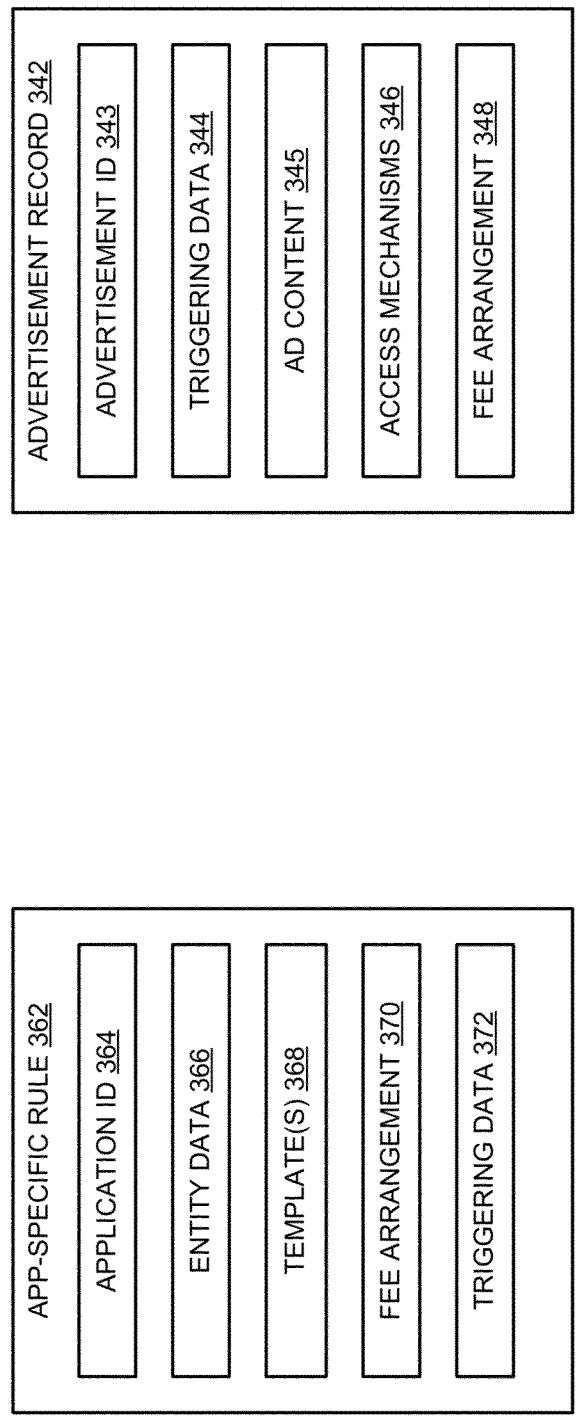

DEEP LINK ADVERTISEMENTS

TECHNICAL FIELD

The disclosure relates to a system and method for generating deep link advertisements and providing the deep link advertisements to a user device.

BACKGROUND

Digital marketing and advertising helps drive today's economy. One reason that advertisers find more value in digital advertising over traditional forms of advertising, such as print and television advertising, is that digital advertising allows advertisers to better target potential consumers. For instance, if the advertiser knows a particular user likes an obscure sport such as disc golf, the advertiser may provide disc golf related advertisements to the user. This user would typically not be presented with such advertisements, unless the advertiser was aware of the user's preferences. As users become more reliant on native applications, the ability to advertise and link to deep states of applications helps advertisers as well as users.

SUMMARY

According to some implementations of the present disclosure, an advertising system is disclosed. The advertising system includes a storage system that includes one or more non-transitory computer readable mediums. The storage system stores a rule data store. The rule data store stores a plurality of app-specific rules. Each app-specific rule corresponds to a software application of a plurality of applications and defines triggering data, a template, and a set of entity types received by the template. The template is used to generate a function identifier based on received entities of the defined entity types. The function identifier corresponds to a state of the software application. The advertising system includes a processing system that includes one or more processors that execute computer readable instructions. The computer readable instructions causing the processing system to receive an ad request from a user device and determine a context category structure based on the ad request. The ad request includes one or more context signals corresponding to the user device and the context category structure indicates a category of applications or application functions and a set of identified entities used to determine the category. The instructions further cause the processing system to identify one or more app-specific rules based on the category defined in the context category. For each app-specific rule, the instructions cause the processing system to: determine whether the identified entities in the context category structure are received by the template defined in the app-specific rule; generate a function identifier based on the set of identified entities and the template when the identified entities are received by the template defined in the app-specific rule; and determine a score for each of the generated function identifiers based on a fee arrangement defined in the app-specific rule used to generate the function ID. The instructions further cause the processing system to select one or more of the generated function IDs based on the respective scores of the generated function IDs, and for each of the selected function IDs, generate an advertisement object corresponding to the function ID. The advertisement includes one or more access mechanisms for accessing the state indicated by the selected function ID. The instructions further cause the processing device to transmit the generated advertisement object to the user device.

According to some implementations of the present disclosure, a method that is executed by a processing system is described. The method includes maintaining a rule data store that stores a plurality of app-specific rules in a storage system. Each app-specific rule corresponds to a software application of a plurality of applications and defines triggering data, a template, and a set of entity types received by the template. The template is used to generate a function identifier based on received entities of the defined entity types. The function identifier corresponds to a state of the software application. The method includes receiving an ad request from a user device and determining a context category structure based on the ad request. The ad request includes one or more context signals corresponding to the user device. The context category structure indicates a category of applications or application functions and a set of identified entities used to determine the category. The method includes identifying one or more app-specific rules based on the category defined in the context category. The method further includes, for each app-specific rule: determining whether the identified entities in the context category structure are received by the template defined in the app-specific rule; generating a function identifier based on the set of identified entities and the template when the identified entities are received by the template defined in the app-specific rule; and determining a score for each of the generated function identifiers based on a fee arrangement defined in the app-specific rule used to generate the function ID. The method includes selecting one or more of the generated function IDs based on the respective scores of the generated function IDs. The method includes for each of the selected function IDs, generating an advertisement object corresponding to the function ID. The advertisement includes one or more access mechanisms for accessing the state indicated by the selected function ID. The method includes transmitting the generated advertisement object to the user device.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3C is a schematic illustrating an example of an app-specific rule.

FIG. 3D is a schematic illustrating an example of an advertisement record.

Like reference symbols in the various drawings indicate like elements.

DETAILED DESCRIPTION

Figure 1A:
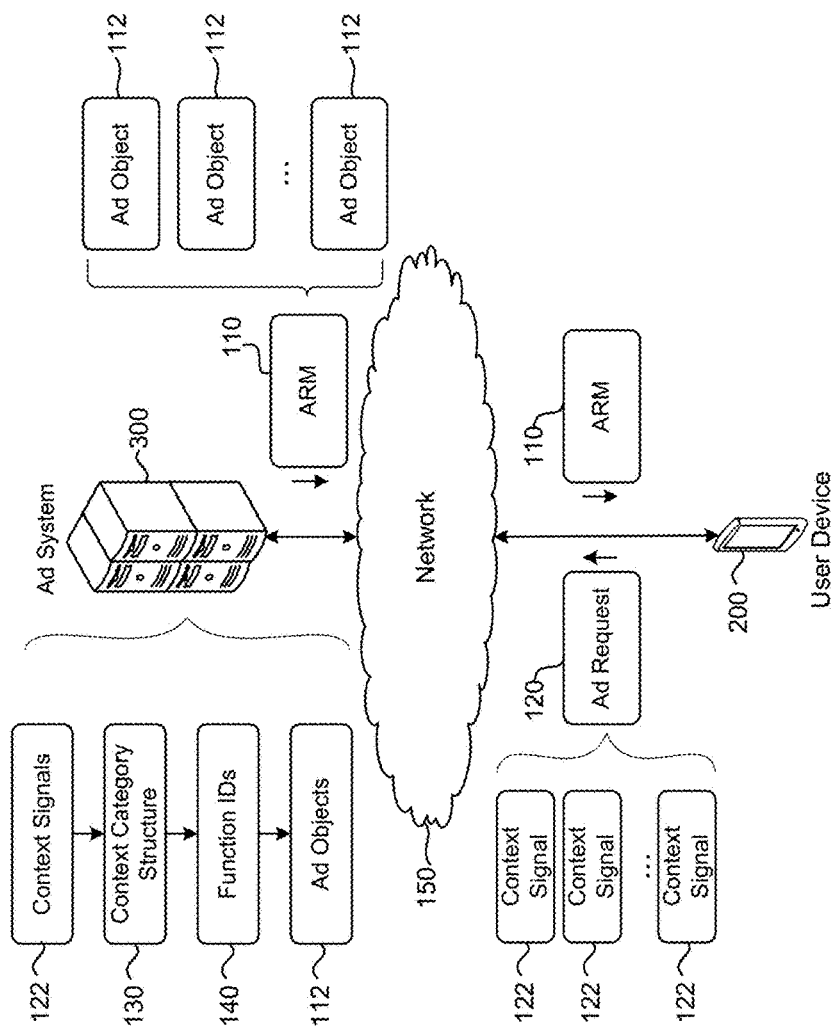
FIG. 1A is a schematic illustrating an example environment of an advertising system that delivers advertisement response messages to user devices.

FIG. 1A illustrates an example environment 10 of an advertising system 300 that provides an advertisement response message 110 ("ARM" 110) to a user device 200 in response to an advertisement request 120 ("ad request" 120). The ad request 120 may be a data structure that the user device 200 transmits to the advertising system 300 that requests one or more advertisements. While FIG. 1A shows a user device 200 transmitting the ad request 120 directly to the advertising system 300, the advertising system 300 can receive ad requests 120 from any suitable computing device. For instance, the advertising system 300 may receive ad requests 120 from an application server (now shown) or web server (now shown) that serves content to a user device 200 running an application that is served by the application server.

In response to an ad request 120, the advertising system 300 generates an advertisement response message (ARM) 110 and transmits the ARM 110 to the user device 200. The ARM 110 contains one or more advertisement result objects 112. An advertisement result object 112 is a data structure that contains data and/or computer readable instructions for rendering an advertisement. The user device 200 can display an advertisement that is generated from the advertisement result object. A displayed advertisement may further include a user selectable link (also referred to as a "link"). A link, when selected by a user, sets the state of the user device 300 to a state of a software application.

Figure 1B:
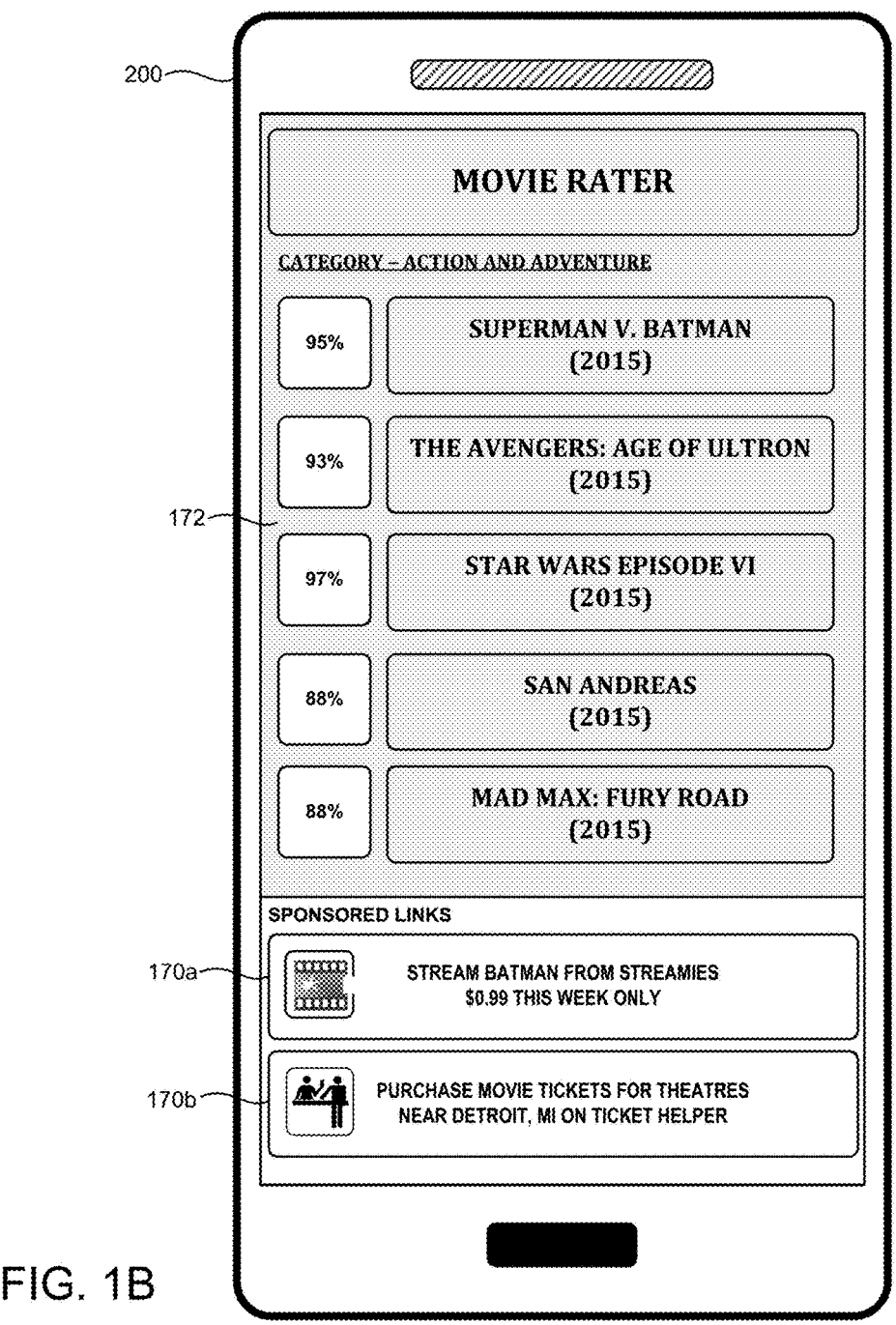
FIG. 1B is a schematic illustrating an example user device displaying generated advertisements.

FIG. 1B illustrates an example of a user device 200 displaying two advertisements 170a, 170b. In the illustrated example, an example native application named "Movie Rater" presents the two advertisements in its GUI 172. In the illustrated example, the first advertisement 170a links to a state of an example software application called "Streamies," whereby the user can stream the movie "BATMAN" by accessing the linked to state. The second advertisement 170b links to a state of an example software application called "Ticket Helper," whereby the user can purchase movie tickets for theatres in Detroit, Mich. by accessing the linked to state. Each respective advertisement 172 may include one or more access mechanisms, whereby when the advertisement 172 is selected by the user (e.g., pressed on by the user), the user device 200 can access the state of the software application using the access mechanism.

A software application can refer to a software product that causes a computing device to perform a function. In some examples, a software application may also be referred to as an "application," "an app," or a "program." Example software applications include, but are not limited to, productivity applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) from the Internet. The functions of an application can be accessed using native application editions of the software application and/or web application editions of the software application.

A native application edition (or "native application") is, at least in part, installed on a user device 200. In some scenarios, a native application is installed on a user device 200, but accesses an external resource (e.g., an application server) to obtain data from the external resource. For example, social media applications, weather applications, news applications, and search applications may respectively be accessed by one or more native application editions that execute on various user devices 200. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software product is encoded in the native application editions itself. The native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, web-based email, online auctions websites, social-networking websites, travel booking websites, and online retail websites. A web application accesses functions of a software product via a network. Example implementations of web applications include webpages and/or HTML-5 application editions.

In many scenarios, a software application may be accessed by one or more native application editions of the software application and/or one or more web application editions of the software application. In these scenarios, there may be overlap between the states or functions that the native application edition(s) can access and the states or functions that the web application edition can access. A user device 200 can access a state of a software application via an edition of the software application using an access mechanism.

Examples of access mechanisms can include, but are not limited to, application access mechanisms, web access mechanisms, application download addresses, and scripts. An application access mechanism may be a string that includes a reference to a native application and indicates one or more parameters or operations that the user device 200 uses to access the referenced state. An application resource identifier (ARI) is an example application access mechanism.

A web access mechanism may be a string that includes a reference to a web application edition of a software product, and indicates one or more parameters and/or operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device 200 may launch a web browser application and may pass the resource identifier to the web browser. The web browser can utilize the resource identifier to retrieve the web resource indicated in the resource identifier and/or access a function of the software application indicated by the resource identifier.

An application download access mechanism may indicate a location (e.g., a digital distribution platform) where a native application can be downloaded in the scenario where a native application edition of the application is not installed on the user device 200. If a user selects a user selectable link including an application download access mechanism, the user device 200 may access a digital distribution platform from which the referenced native application edition may be downloaded. The user may opt to download the native application edition. Upon doing so, the user device 200 may launch the native application edition and may access the state of the software application using the native application edition and an application access mechanism associated with the user selectable link.

A script is a set of instructions, that when executed by the user device 200 causes the user device to access a resource indicated by the script. For example, the script may instruct an operating system of the user device 200 to launch the native application, and may define one or more additional instructions to access a particular state of the application. Another type of access mechanisms may include scripts, which may be used instead of other type of access mechanism when an edition of a software application is not configured to be referenced by the other types of access mechanisms.

An advertisement result object 112 may contain display data 114 and one or more access mechanisms 116. The display data 114 can include any data that is displayed in the advertisement. For example, the display data 114 may include text, images, logos, and/or animations that are presented to the user in a corresponding advertisement via a user interface of the user device 300.

The one or more access mechanisms included in an advertisement result object 112 are used to generate the link that links to the advertised state. In some implementations, the advertisement result object 112 may include an application access mechanism; a web access mechanism, a script, and/or an application download access mechanism. In this way, when a native application edition of a software application is installed on the user device 200, the user device 200 may launch and access the advertised state of the software application using the native application edition when the user selects the corresponding link. If a native application edition is not installed on the user device 200, the user device 200 may access the advertised state of the software application using a web application edition using the web access mechanisms. Additionally or alternatively, if a native application edition is not installed on the user device 200, the user device 200 may launch and access a digital distribution platform where the user may opt to download a native application edition of the software application indicated in the selected advertisement 172. In some implementations, in response to the selection of an advertisement, a script may instruct the user device 200 to attempt to launch a native application edition to an advertised state and if the native application edition is not installed on the user device 200 to access the advertised state via a web application edition.

In some implementations, a state of a software application may be referenced using a function identifier 140 (function ID). In some implementations, a function ID 140 is a string of alphabetic, numeric, and/or symbolic characters (e.g., punctuation marks) that uniquely identifies a state of an application. Put another way, a function ID 140 may be a unique reference to a state of a software application. In some implementations, a function ID 140 can be in the format of a resource identifier. For example, the function ID 140 may be a uniform recourse locator (URL) or an application resource identifier. In these implementations, the function ID 140 may be used by a user device 200 to access a software application via a web application edition or one or more native application editions of the software application, respectively. In some implementations, a function ID 140 can map to one or more access mechanisms. In these implementations, a function ID 140 may map to one or more web resource identifiers (e.g., a URL), one or more application resource identifiers, and/or one or more scripts. For instance, a state of an example software application, "exampleapp," may be accessed via a web application edition and two native application editions (e.g., an edition configured for the ANDROID operating system and an edition configured for the WINDOWS PHONE operating system). In this example, the web resource identifier may be: www.exampleapp.com/param1=abc¶m2=xyx, the first application resource identifier may be android.exampleapp::param1=abc¶m2=xyx, and the second application resource identifier may be windows.exampleapp::param1=abc¶m2=xyx. In this example, a function ID 140 may map to the web resource identifier and the two application resource identifiers. A function ID 140 may have a URL-like structure that utilizes a namespace other than http://, such as "func://" which indicates that the string is a function ID 140. In the example of "exampleapp" above, the function ID 140 corresponding to the example state may be func://exampleapp::param1=abc¶m2=xyx which maps to the access mechanisms described above. In another example, a function ID 140 may take the form of a parameterizable function. For instance, a function ID 140 may be in the form of "app_id[action(parameter_1, . . . , parameter_n)]", where app_id is an identifier (e.g., name or unique value) of a software application, action is an action that is performed by the application (e.g., "view menu"), and parameter_1 . . . parameter_n are n parameters that the software application receives in order to access the state corresponding to the action and the parameters. Drawing from the example above, a function ID 140 may be "exampleapp[example_action(abc, xyz)]".

Given a function ID 140 and the referencing schema of an application, a function ID 140 may be used to generate the access mechanisms defined above. For example, the example function IDs 140 discussed above may be used to generate access mechanisms that access the example application. Additionally or alternatively, the above example function ID 140 may map to the access mechanisms defined above. Furthermore, while function IDs 140 have been described with respect to resource identifiers, a function ID 140 may map to one or more scripts that access a state of a software application or may be utilized to generate one or more scripts that access a state of the software application. It is noted that some software applications may have a common scheme for accessing all of their respective native application editions. In such scenarios, a single application resource identifier may access multiple application editions. Further, a function ID 140 may take any other suitable format. For example, the function ID 140 may be a human-readable string that describes the state of the application to which the function ID 140 corresponds.

A function ID 140 may be parameterized or unparameterized. A parameterized function ID 140 is a function ID 140 that has been assigned one or more parameter values. Drawing from the example above, the function ID 140 that points to a specific state of the example application is parameterized with the following values: param1 is set to "abc" and param2 is set to "xyx." An unparameterized function ID 140 is a function ID 140 that has not been assigned one or more parameter values. The unparameterized function ID 140 may be used as a template to generate parameterized function IDs 140. Additionally or alternatively, an unparameterized function ID 140 may correspond to a state of an application where a user may access a corresponding function of an application. For instance, an unparameterized function ID 140 corresponding to an airline ticket purchasing application (e.g., "Flight Finder") may be: Flight_Finder[find_tix(departure_airport, arrival_airport, departure_date, return_date)] or func::flighfinder/find_tix?dept_code[airport_code]&arriv_code=[airport_code]&dept_date=[date]&ret_date=[date]. The foregoing example function IDs 140 may correspond to the state of the Flight Finder application where a user can search for airline tickets and/or may be used to identify dynamic states of the Flight Finder application (e.g., states that show ticket options for round-trip tickets between two airports on particular dates).

The advertising system 300 receives an ad request 120 and generates advertisement result objects 112 based thereon. The ad request 120 may include one or more context signals 122. The context signals can include a reference (e.g., URL or application resource identifier) to a state of a software application currently accessed by the user device 200 and/or a set of keywords that correspond the current state (e.g., keywords presented at the current state). The context signals 122 may further include location information (e.g., a geolocation of the user device 200, zip code of the user device 200, or the city of the user device 200), a set of applications that are installed on the user device 200, a time of the day, and/or a day of the week.

The advertising system 300 may utilize the context signals 122 to determine one or more context category structures 130 corresponding to the user. A context category structure 130 may define a context category. A context category structure 130 may be any variable or data structure that indicates a relative likelihood that a user of the user device 200 is interested in an application that pertains to a corresponding context category. A context category may represent a type of a group of applications and/or a type of a group of actions performed by applications. For example, the context categories may include: "events," "entertainment," "retail," "make travel arrangements," and "travel." The foregoing are non-limiting examples of categories. The categories may be manually determined. Additionally or alternatively, the categories may be learned by a machine-learner. An example context category 140 structure may be defined as:

{ category_id;
Category_score;}

Where the category_id may be a numeric or alphanumeric string that uniquely identifies a category and the category score may be a value indicating the relative likelihood. In some implementations, a context category structure 130 may include additional fields, including an entity array that identifies entities that are relevant to the category. Each entry in the entity array may identify the entity and an entity type of the entity. For example, if the context signals 122 included the keywords "LAX" and "JFK", the entity array may include the entities: "LAX; airport code" and "JFK; airport code."

The advertising system 300 utilizes the context category structures 130 and the context signals 122 to generate the advertisement result objects 112. The advertising system 300 may identify one or more indexed advertisements (e.g., advertisement records) using the context category structures and the context signals 122. The identified advertisement records may indicate a function ID 140 and/or access mechanisms of an advertised state of a software application. Additionally or alternatively, the advertising system 200 may generate one or more advertisements using the context category structures and the context signals 122. In some implementations, the advertising system 200 generates access mechanisms and/or function IDs 140 using the context category structures and the context signals 122. In implementations where the advertising system 200 generates function IDs 140, the generated function ID 140 may correspond to a dynamic state of a software application. The advertising system 300 or the user device 200 may utilize the generated function ID 140 to generate or lookup one or more corresponding access mechanisms to access the dynamic state of the application. The advertising system 300 may include the generated access mechanism(s) and/or the generated function ID 140 in an advertising result object 120. The advertising system 300 may include the advertising result objects 120 in an advertisement response message 110, which the advertising system 300 transmits to the user device 200, either directly or via an intermediate device.

By being configured to generate function IDs 140, the advertising system 300 increases the amount of states that can be advertised. Furthermore, the advertising system 300 can provide links to dynamic states of applications. The advertising system 300 does not need to keep an up-to-date ad inventory (although it may still), so the advertising system requires less storage space than conventional advertising systems 300.

Figure 2:
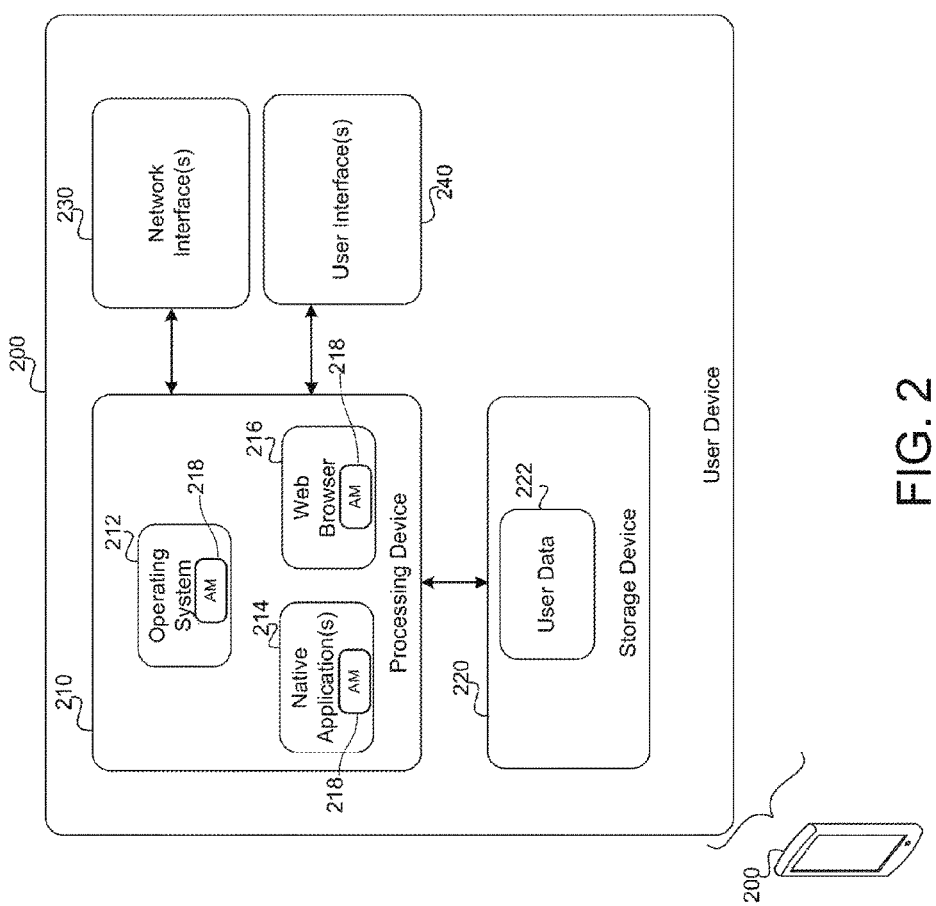
FIG. 2 is a schematic illustrating an example user device configured to request advertisements from an advertising system.

FIG. 2 illustrates an example user device 200 and an example set of components of the user device. In the illustrated example, the user device 200 includes a processing device 210, a storage device 220, a network interface 230, and one or more user interfaces 240.

The processing device 210 can include one or more processors that execute computer-executable instructions and associated memory (e.g., RAM and/or ROM) that stores the computer-executable instructions. In implementations where the processing device 210 includes more than one processor, the processors can execute in a distributed or individual manner. The processing device 210 can execute an operating system 212, one or more native applications 214, and one or more web browsers 216 (a specific type of native application 214), all of which can be implemented as computer-readable instructions that are executed by the processing device 210. The operating system 212, the one or more native applications 214, and/or the web browser 216 may include an ad module 218, described in greater detail below.

The storage device 220 can include one or more computer-readable mediums (e.g., hard disk drives, solid state memory drives, and/or flash memory drives). The storage device 220 can store any suitable data that is utilized by the operating system of the user device 200. The storage device 220 can be in communication with the processing device 210, such that the processing device 210 can retrieve any needed data therefrom. The storage device 220 can store one or more instances of user data 222. The user data 222 may be any data that the user has agreed to share, including an age of the user, a sex of the user, a hometown of the user, a list of applications installed on the user device, and the like.

The network interface 230 includes one or more devices that are configured to communicate with a communication network. The network interface 230 can include one or more transceivers for performing wired or wireless communication. Examples of the network interface 230 can include, but are not limited to, a transceiver configured to perform communications using the IEEE 802.11 wireless standard, an Ethernet port, a wireless transmitter, and a universal serial bus (USB) port.

The user interface 240 includes one or more devices that receive input from and/or provide output to a user. The user interface 240 can include, but is not limited to, a touchscreen, a display, a QWERTY keyboard, a numeric keypad, a touchpad, a microphone, and/or speakers.

Native applications 214 and/or the web browser(s) 216 (or web applications partially executed by the web browser) may respectively include an ad module 218. An ad module 218 generates ad requests 120 and transmits the ad requests 120 to the advertising system 300. As previously mentioned, the ad module 218 may transmit the ad request 120 directly to the advertising system 300 or via an intermediate device (e.g., an application server or web server).

In operation, the ad module 218 determines a set of one or more context signals 122 to include in the ad request 120. The context signals 122 may include any data that can be collected from the user device 200. Examples of the context signals 122 may include, but are not limited to, an indicator of the current state of the user device 200 (e.g., a resource identifier or function ID of a state of an application), a set of keywords that are presented at the current state of the user device 200 (e.g., keywords extracted from an article or page being viewed by a user), location information corresponding to the user device 200, user data of a current user of the user device 200, or a set of open applications on the user device 200.

The ad module 218 collects context signals 122 corresponding to a state of an application currently being accessed by the user of the user device 200. The ad module 218 may determine a resource identifier corresponding to the state currently being accessed. In some implementations, the ad module 218 reads a web resource identifier (e.g., URL) or an application resource identifier indicating the state currently being accessed (e.g., a displayed webpage or a page of an open native application). The determined resource identifier may be included in the context signals 122. Additionally or alternatively, the ad module 218 may identify a set of keywords corresponding to the state of the application being accessed. The ad module 218 may scrape a document corresponding to the state of the application being accessed to determine the words presented at the state currently being accessed. For example, if the state currently being accessed is encoded in an HTML or XML document, the ad module 218 can parse the document to identify the main text in the document (e.g., the title of an article, the author of the article, and the body of the article). The ad module 218 can analyze the text to determine a set of uni-grams (single words), bi-grams (two consecutive words), tri-grams (three consecutive words), etc. In some implementations, the set may be limited to uni-grams only; uni-grams and bi-grams; or uni-grams, bi-grams and tri-grams. In some implementations, the ad module 218 removes any commonly used words (e.g., any word appearing in a list of the 250 most used words in the language of the document) from the set. The set of uni-grams, bi-grams, tri-grams, etc. may be included in the context signals 122. It is noted that the state of an application currently being accessed may also refer to states that were accessed within a recent time period (e.g., the previous hour or previous day). Furthermore, in some implementations, the The ad module 218 may collect location information for inclusion in the context signals. For example, the ad module 218 may request a current geolocation of the user device 200 from a global positioning system (GPS) of the user device 200. The current geolocation of the user device 200 may be included in the context signals 122. Additionally or alternatively, the ad module 218 may obtain an IP address of the user device 200, which can be indicative of a general area of the user device 200. The ad module 218 may include other suitable location information, such as a current city, state, or zip code of the user device 200. The ad request 120 may include the IP address in the context signals 122.

The ad module 218 may collect user data of the user for inclusion in the context signals 122. For example, the ad module 218 may include information from a user profile of the user (e.g., age, sex, hometown, income, 'likes' on a social networking application) in the context signals. Additionally or alternatively, the ad module 218 may include a browser history of the user and/or a set of recently accessed applications in the context signals 122. The inclusion of user data may be contingent on the user agreeing to share such data with an application and/or in accordance with privacy laws of a jurisdiction in which the user device 200 is located.

The ad module 218 generates the ad request 120 based on the context signals 122. The ad module 218 may instantiate a new ad request 120 and may include the collected context signals 122 in the new ad request 120. In some implementations, the ad module 218 may further include a number of requested ads. The number of requested ads may indicate a number of advertisement result objects to include ARM 110. The ad module 218 transmits the ad request 120 to a remote computing device. The ad module 218 may transmit the ad request 120 to the advertising system 300 or to an intermediate device (e.g., an application server).

In response to the ad request 120, the ad module 218 receives an ARM 110 containing one or more advertisement result objects 112. The ad module 218 can output the advertisement result objects 112 to the application that called the ad module 218. The application may render and present the advertisements corresponding to the result objects 112 in the graphical user interface of the application. Additionally or alternatively, the ad module 218 may render and present the advertisements in the graphical user interface.

Figure 3A:
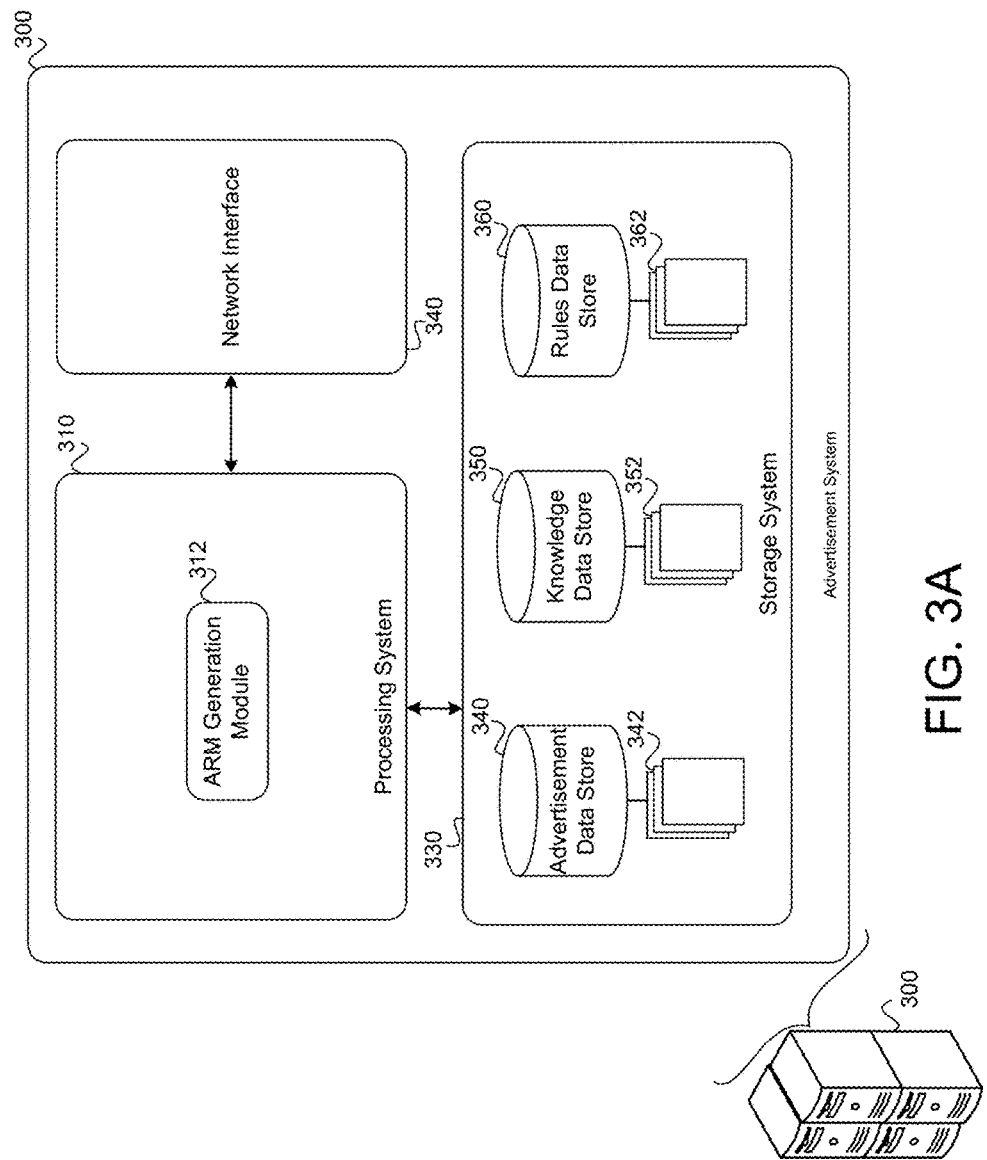
FIG. 3A is a schematic illustrating example components of an advertising system.

FIG. 3A illustrates an example configuration of an advertising system 300. In the illustrated example, the advertising system includes a processing system 310, a network interface 320, and a storage system 330. The advertising system 300 may include additional components not explicitly shown in FIG. 3A.

The processing system 310 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. Moreover, the processors may be located at different physical locations. The processing system executes an ARM generation module 312.

The network interface device 370 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 330 includes one or more storage devices. The storage devices may be any suitable type of computer readable mediums, including but not limited to read-only memory, solid-state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 330 may store an advertisement data store 340, a knowledge data store 350, and/or a rules data store 360.

The ARM generation module 312 receives an ad request 120 and outputs an ARM 110. As previously discussed an ARM 110 includes one or more advertisement result objects 112. Each advertisement result object 112 includes one or more access mechanisms 114 and display data 116. As will be discussed, the ARM generation module 312 determines the access mechanisms 114 by retrieving the access mechanisms 114 from the advertisement data store 250 and/or by generating the access mechanisms 114 based on the context signals 122.

Figure 3B:
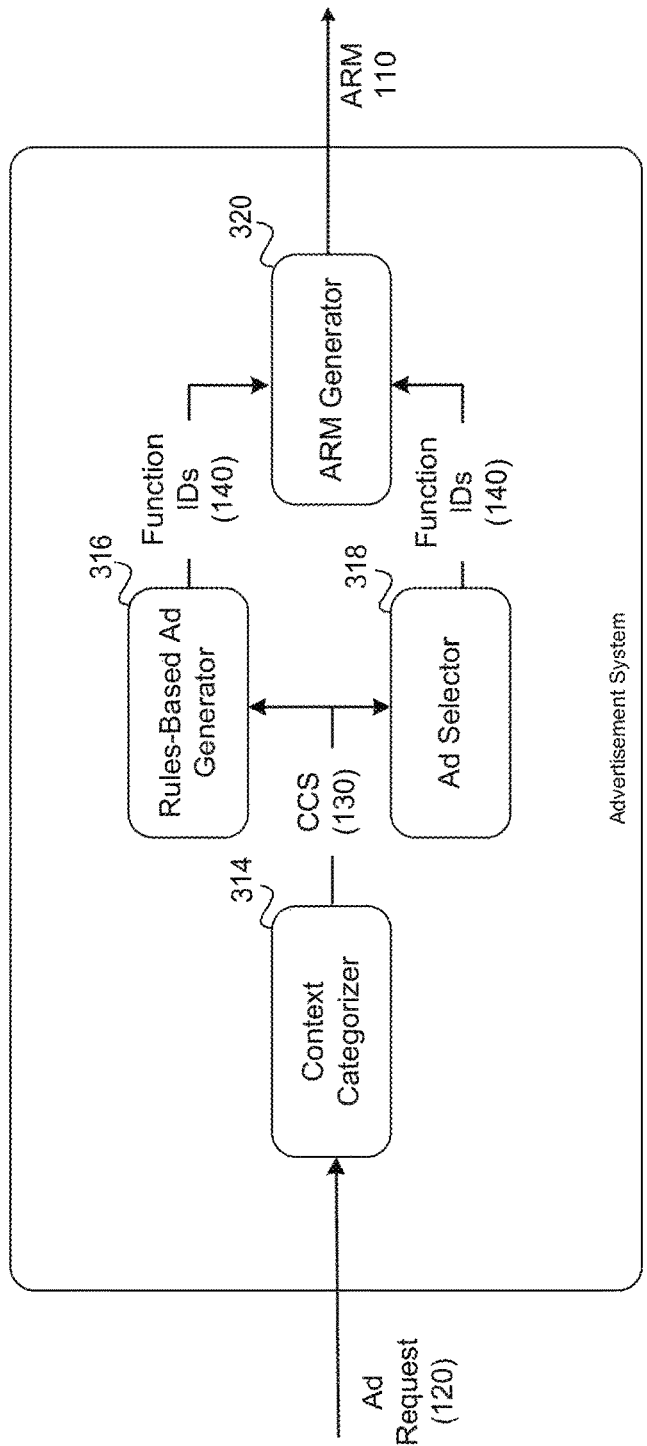
FIG. 3B is a schematic illustrating example components of an ARM generation module.

FIG. 3B illustrates example components of an ARM generation module 312. The ARM generation module 312 may include a context categorizer 314, a rules-based ad generator 316, an ad selector 318, and an ARM generator 320. The context categorizer 314 receives an ad request 120 and outputs one or more context category structures 130. The rules-based ad generator 316 may receive the context category structure(s) 130 and context signals 122 and may generate one or more function IDs 140 based thereon. The ad selector 318 may receive the context category structures 130 and/or context signals 122 and may identify one or more function IDs 140 based thereon. The ARM generator 320 receives function IDs 140 from the rules-based ad generator 316 and/or the ad selector 318 and ranks the function IDs 140. The ARM generator 320 selects the ads that are to be included in the ARM 110 based on the respective rankings of the function IDs 140. The ARM generator 320 may generate the advertisement objects 112 based on the selected function IDs 140.

The context categorizer 314 receives the ad request 120 and outputs a context category structure 130 based on the context signals 122 contained in the ad request 120. As previously discussed, the context signals 122 may include information regarding a state of an application being accessed (or recently accessed) by a user. This information may include a resource identifier referencing the state and/or keywords presented by the application at the state. In the former scenario, the context categorizer 314 may obtain a document corresponding to the state referenced by the resource identifier. For example, the context categorizer 314 may issue an HTTP request or analogous request to the resource indicated by the resource identifier. In turn the resource responds with the requested document (e.g., an HTTP file). The context categorizer 314 may extract the keywords associated with the state in the manner discussed above. For example, the context categorizer 314 may parse the document for recognized tags and may extract the keywords from the data corresponding to the tags. The context categorizer 314 may utilize any suitable scraping techniques to identify the keywords from the document. The keywords, as well as other context signals such as location, time, and/or user data, may be used to determine the context category structure 130.

A context category structure 130 may be a variable or data structure that indicates a relative likelihood that a user is interested in an application or application action that pertains to a corresponding category. The categories may be manually defined and/or learned by a machine learner. The context categorizer 314 utilizes the knowledge data store 350 to determine the context category structure 130. A context category structure 130 may also identify one or more keywords that were used to determine the category, as well as the predicted entity type or types thereof. The combination of a keyword and an entity type may be referred to as an entity.

The knowledge data store 350 stores data that is used to identify different categories. Put another way, the knowledge data store 350 associates data with different categories. The knowledge data store 350 may associate keywords and other types of data with the different categories. The knowledge data 350 store may be used by other systems (e.g., a search system or recommendation system) and/or for other purposes (e.g., query intent determination). The knowledge data store 350 can include one or more databases, ontologies, indexes, lookup tables and/or graphs.

In some implementations, the knowledge data store 350 may include an inverted index 352 that indexes different categories. The inverted index 352 may be keyed by keywords and/or other types of data. For example, the inverted index 352 may be keyed by locations, times of the day, days of the week, seasons, "likes" on social media applications, etc. The query categorizer 314 queries the inverted index 352 with the keywords obtained from or using the ad request 120. For each keyword, the inverted index may output categories that are associated with the keyword. For example, an ad request 120 may reference a news article about the Detroit Tigers baseball team or may contain the keyword "Detroit Tigers," which may have been scrapped from the news article by the user device 200. The context categorizer 314 queries the inverted index with the keyword. In this example, the inverted index may output a "sports event" category and a "sports news" category. In some implementations, the inverted index 352 may also output an index score. The index score indicates a degree of correlation between the keyword and the category. For example, if the keyword is "Detroit Tigers," the index score of the "sports event" category may be relatively high, while the index score of a "movies" category may be relatively low. Furthermore, while the inverted index 352 has been discussed with respect to keywords, the inverted index may be queried with additional information. For example, if the context signals 122 indicate that the user is in Detroit, Mich., the context categorizer 314 may query the inverted index 352 with the location Detroit, Mich. In this example, the inverted index 352 may return the following categories: "restaurant information" "entertainment event tickets," "real estate listings" and "sports event tickets."

The knowledge base 350 may also relate keywords to entity types. In these implementations, the knowledge base 350 may be defined according to an ontology. In some implementations, the knowledge base 350 includes an entity index. The entity index may be an inverted index. The entity index receives a keyword (e.g., an n-gram where n is greater than or equal to one) and outputs potential entity types of the keyword. The entity index may also output an entity score for each entity type. The entity score indicates a likelihood that the keyword is of the entity type. The entity/entity type associations may be learned over time and/or may be manually entered.

The query categorizer 316 may generate one or more context category structures 130 based on the output of the inverted indexes 352. For each category identifier output by the inverted index 352, the query categorizer 316 may determine a category score of the category. The query categorizer 316 may determine the category score in any suitable manner. For example, the query categorizer 316 may calculate the score of a category as a function of the number of times the category was output by the inverted index 352, whereby the category score of the category is positively correlated with the frequency with which the inverted index outputted the category. In some implementations, the query categorizer 316 can normalize the category score of each category to a value between zero and an upper limit (e.g., one) with respect to the other category scores. For instance, if the inverted index outputs a first category six times, a second category three times, and a third category one time, the first category may be assigned a category score of 0.6, the second category a category score of 0.3, and the third category a category score of 0.1. The query categorizer 316 may determine the category score of each category in any other suitable manner. The query categorizer can assign the category score of the category to the category, thereby creating a context category structure.

A context category structure 130 may include additional information. For example, the context category structure may include a set of keywords that were used to determine the category defined in the context category. Each of the keywords may be matched with an entity type. For instance, if the keyword "Detroit Tigers" was used to identify the category "sports events," the keyword "Detroit Tigers" may be included in the context category structure. In this example, the entity types "professional baseball team" and/ or "sports team" may be assigned thereto. The context categorizer 314 may determine the entity types using, for example, a mapping mechanism such as an inverted index, a lookup table, or an entity graph. In these implementations, the context category structure 130 may include an additional element, such as an array that receives the keywords/entity type combination(s) used to identify the category.

In some implementations, the context categorizer 314 outputs the context category structures to a rules-based ad generator 316. The rules-based ad generator 316 receives a context category structure and one or more keywords or other context signals 122 and may generate one or more function IDs 140 based thereon. The rules-based ad generator 316 utilizes app-specific rules 362 to generate the function IDs. The function IDs 140 can be used to generate one or more access mechanisms and to determine a layout for an advertisement.

An app-specific rule 362 may be a set of computer-readable instructions that defines one or more templates that are used to generate function IDs 140 (or access mechanisms) and instructions defining a manner by which a function ID 140 is generated given the template and a set of entities (which may be obtained from the context category structure 130 and/or the context signals 122). An app-specific rule 362 may be specific to an application and is encoded in a file (e.g., a .json file).

FIG. 3C illustrates an example of an app-specific rule 362. An app-specific rule 362 can include an application ID 364 that identifies an application to which the rule 362 pertains, a set of entity types 366 received by the app-specific rule 362, one or more templates 368, a fee arrangement 370, and triggering data 372.

The set of entity types 366 indicates the types of entities that are used by the one or more templates 368. For example, an app-specific rule 362 directed to a restaurant review application may receive the following entity types: a location entity and a cuisine entity. Similarly, an app-specific rule 362 directed to a theatre ticket purchasing application may receive a location entity, a movie title entity, and possibly a time entity. In this example, the app-specific rule may output a function ID 140 that indicates a location, a movie title, and a time.

A template 368 is a set of instructions and/or data for generating a function ID. The template 368 can define a structure of the function ID 140. Given a set of entities (e.g., keywords and/or other context signals), the ad generator 316 generates a function ID 140 using a template and the set of entities. Appendix A illustrates an example of a template. In the example of Appendix A, the template is used to generate function IDs 140 for accessing a movie database application (the IMDB application). In the example of Appendix A, the template generates function IDs that utilize a URL-like namespace. The templates may be used to generate function IDs 140 having different structures as well. For instance, the templates may be used to generate function IDs 140 having a function-like scheme (e.g., application[broad_action] (param_1, . . . , param_n)]. In these implementations, the templates may be unparameterized function IDs 140, such that the ad generator 316 may parameterize the unparameterized function ID 140 with one or more entities (e.g., keywords and/or other context signals). In such implementations, the ARM generator 316 outputs the parameterized function IDs.

The fee arrangement 370 indicates an agreement entered into with the advertiser. The fee arrangement 370 can indicate an amount the advertiser agrees to pay in exchange for a predefined action. Examples of fee arrangements 370 can include cost-per-click, cost-per-impression, or cost-per-purchase. The fee arrangement 370 may further define a budget (e.g., a maximum spend for a period of time). The fee arrangement 370 may pertain to the app-specific rule 364, whereby any advertisement generated based on a template 368 defined in the rule 364 is subject to the fee arrangement 370.

The triggering data 372 can define conditions for using the app-specific rule 362. In some implementations, the triggering data 372 identifies one or more categories. The ad generator 316 can select the app-specific rule 362 based on the triggering data and the category indicated in a context category structure. The triggering data 372 may include additional or alternative conditions. For example, the triggering data 372 can define geographic locations that the ad may be restricted to (e.g., only show in the Bay Area or in New York Metro Area).

An app specific rule 362 may include additional data not described herein. Furthermore, in some implementations, the templates 368 may define instructions for generating access mechanisms instead of function IDs 140. In these implementations, a template 368 may define the structure of an access mechanism that is configured for a particular platform or set of platforms. In this way, an app-specific rule 364 may be used to generate access mechanisms.

Referring back to FIG. 3B, the rules-based ad generator 316 receives the context category structure 130. In some implementations, the context category structure 130 may indicate a category, a category score, a set of entities (e.g., keywords or identifiers thereof) and the respective types of the entities. The rules-based ad generator 316 may select one or more app-specific rules 362 based on the category defined in the context category structure 130. According to some implementations, if the category score of a category defined in the context category structure 130 is above a threshold (e.g., greater than 0.5), the rules-based ad generator 316 retrieves any app-specific rules 362 indicating the category defined in the context category structure 130 in the triggering data 372 of the app-specific rule 362.

For each app-specific rule 362 identified by the rules-based ad generator 316, the rules-based ad generator 316 can determine whether the rule 362 is applicable. The rules-based ad generator 316 can determine whether an app-specific rule 362 is applicable based on the entity data 366 defined in the app-specific rule 362 and the entity types defined in the context category structure 130. If a template 368 defined in the app-specific rule 362 receives a requisite set of entity types defined in the context category structure, then the rules-based ad generator 316 can generate a function ID 140 using the template 368 defined in the app-specific rule 362. If the app-specific rule 362 does not contain a template 368 that receives a requisite set of entity types, then the rules-based ad generator 316 can disregard the app-specific rule 362.

For each app-specific rule 362 that contains a template 368 (or multiple templates) that receives a set of entity types (one or more entity types) defined in the context category structure 130, the rules-based ad generator 316 generates one or more function IDs using the app-specific rule 362. As previously discussed, the template(s) 368 defined in the app-specific rule 362 include the structure of a function ID 140 corresponding to a particular application. Furthermore, a template 368 defines the entity types that are received by the template 368. The rules-based ad generator 316 can input the entity or entities (e.g., keyword or keywords) in the context category structure 130 of the entity type or entity types received by the template 368 into the template 368. In some scenarios, the rules-based ad generator 316 may have to adjust the entity to conform to the template 368. For example, a template may not accept spaces between terms and instead may receive underscores or dashes. In another example, a template may be configured to receive an identifier of an entity (e.g., restaurant ID or movie ID). In such scenarios, an app-specific rule 262 may define a manner by which the rules-based ad generator 316 can adjust the entity to conform to a format that is accepted by the app-specific rule 362.

In an example, a context category structure may define "watch a movie" as the category and may define, inter alia, an example movie title entity, "Toy Story 10," and an example city entity, "Detroit, Mich." In this example, one of the identified app-specific rule 362 pertains to an example movie ticket purchasing application, the "MovieTix" application, and the context category structure included the title of an example movie, "Toy Story 10," and an example location, "Detroit, Mich.", the template 368 may include rules that instruct the rules-based ad generator 316 to remove commas from the keywords and to substitute dashes ("-") for spaces.

Thus, if the template 368 corresponding to the MovieTix application is: MovieTix[FindTickets(movie title, location)], the rules-based ad generator 316 may generate the following function ID: MovieTix[FindTickets(Toy-Story-10, Detroit-MI)]. In another example, the template may be configured to receive a movie title ID instead of a movie title. In such a scenario, the rule may instruct the rules-based ad generator 316 to substitute a movie title ID specific to the MovieTix application for the title. For example, the rules-based ad generator 316 may look up a movie title ID for the "Toy Story 10" movie from the knowledge base 350. In this example, the movie title ID "10150" may identify the "Toy Story 10" movie title on the MovieTix application. The rules-based ad generator 316 may then substitute the value "10150" for the "Toy Story 10" movie title when generating a function ID 140. Thus, the rules-based ad generator 316 may generate the following function ID 140 given the example context category structure 130: MovieTix[FindTickets(10150, Detroit-MI)]. The foregoing are provided for example only. An app-specific rule 362 may define any suitable formatting requirements for a function ID 140.

In operation, the rules-based ad generator 316 receives a context category structure 130 and, if applicable, generates one or more function IDs 140 based on the context category structure 130 and the app-specific rules 362 stored in the rules data store 360. The rules-based ad generator 316 searches the rules data store 360 for app-specific rules 362 corresponding to the category defined in the context category structure. In some implementations, the rules-based ad generator 316 queries an inverted index using the category (e.g., using a category ID), and the inverted index outputs the app-specific rules 362 corresponding thereto. The inverted index may output app-specific rules 362 containing triggering data 372 that matches the category used to query the inverted index. The rules-based ad generator 316 can pare down the app-specific rules 362 based on the keywords defined in the context category structure. In some implementations, the rules-based ad generator 316 keeps app-specific rules 362 that have templates that receive entity types indicated in the context category structure. The rules-based ad generator 316 then generates function IDs 140 based on the templates 368 defined in the kept app-specific rules 362 and the entities defined in the context category structure 130. The rules-based ad generator 316 outputs the generated function IDs 140 to the ARM generator 320. For each outputted function ID 140, the rules-based ad generator 316 may also associate the app-specific rule 362 and the entities that were used to generate the function ID 140 with the generated function ID 140.

In some implementations, the ARM generation module 312 includes an ad selector 318 that determines a set of function IDs 140 based on the context category structure 130 and an advertisement data store 340. An advertisement data store 340 stores data used to identify and generate electronic advertisements that link to known states of applications. An advertisement data store 340 may include databases, lookup tables, indexes, and/or records.

The advertisement records 342 represent an ad inventory of static advertisements. Put another way, the advertisement records respectively correspond to static states of applications. For example, an advertisement record 342 may correspond to a particular state of a retail application where a user may purchase a particular product. This state may be accessible via multiple editions of the retail application. An advertisement record 342 can include the access mechanisms used to access the particular state, whereby one or more of the access mechanisms are included in an advertisement that links to the particular state.

FIG. 3D illustrates an example of an advertisement record 342. An advertisement record 342 may include an advertisement ID 343, triggering data 344, ad content 345, access mechanisms 346, and a fee arrangement 348. Each advertisement record 342 corresponds to a respective state of an application.

An advertisement ID 343 identifies the advertisement record 342 from other advertisement records 342. In some implementations, the advertisement ID 343 is a function ID corresponding to the state identified by the advertisement record 342.

The triggering data 344 may include any data that the advertiser wishes to use to trigger the advertisement. The triggering data 344 may identify categories, keywords, and locations that trigger the advertisement. For example, the triggering data 344 of an advertisement record 342 that corresponds to a retail application and, in particular, a state where a user can order a particular type of paint, may identify a particular category (e.g., shopping for goods) and one or more entities (e.g., "latex paint" or "home repair"). In another example, an advertiser may only wish to show an advertisement to users in a particular area (e.g., the state of California). In this example, the triggering data 344 may further define the particular area in the triggering information. The triggering data 344 may be supplied by an advertiser or determined by a person affiliated with the advertising system 300.

The ad content 345 may define any content that is displayed at rendering time when the advertisement is displayed. The ad content 345 may include any text that is displayed in the advertisement. For example, the ad content 345 may include a title of the state of the linked to application, a name of the application, and/or a description of the state. The ad content 345 may include any images or pointers to images that are displayed in the advertisement. Images may be any suitable images including images of an advertised thing, a logo of an application, or a logo of the advertised thing. For example, the ad content 345 of an advertisement record 342 that corresponds to the state of the retail application where the user can purchase a particular brand of paint may include an image of a paint can, a logo of the brand of paint, or a logo of the application.

The access mechanisms 346 include one or more access mechanisms that link to an advertised state. If the state may be accessed using different application editions that receive different access mechanisms, then the advertisement record 342 can include more than one access mechanism. Each access mechanism links to the same state of the application, but is configured to access the state using a different application edition.

The fee arrangement 348 indicates an agreement entered into with the advertiser. The fee arrangement 348 can indicate an amount the advertiser agrees to pay in exchange for a predefined action. Examples of fee arrangements 348 can include cost-per-click, cost-per-impression, or cost-per-purchase. The fee arrangement 348 may further define a budget (e.g., a maximum spend for a period of time). The fee arrangement 348 may pertain to the application record 342, whereby any advertisement based on the application record 348 is subject to the fee arrangement 348.

In operation, the ad selector 318 receives a context category structure and determines a set of function IDs based on the context category structure. The ad selector 318 receives the context category structure from the context categorizer 314. The ad selector 318 determines a set of application records 342 based on the context category structure. In some implementations, the ad selector 318 queries an inverted index that indexes the application records 342 using the category indicated in the context category structure, an entity indicated in the context category structure, and/or a location. The inverted index may index the application records 342 according to the triggering data 346 contained in the application records 342. The ad selector 318 queries the inverted index with the data contained in the context category structure 130 (e.g., a category and one or more entities). In some implementations, the ad selector 318 may query the inverted index with multiple constraints. For example, the ad selector 318 may query the inverted index with the following (Category_0100 AND (entity_1 OR entity_2 OR entity_3)), where Category_0100 is the category ID indicated in the context category structure and entity_1, entity_2, and entity_3 are the entities indicated in the context category structure. In the foregoing example, the inverted index returns an application record 342 only if the triggering data 344 indicates the category and at least one of the entities contained in the context category structure. The inverted index outputs the application IDs (e.g. function IDs) of the application records 342. The ad selector 318 and the inverted indexes may be implemented using the Lucene Server Software Libraries by the Apache Software Foundation. The ad selector 318 can output the function IDs of the identified application records 342 to the ARM generator 320.

The ARM generator 320 receives function IDs 140 from the ad selector 318 and/or the rules-based ad generator 316 and generates an ARM 110 based thereon. In some implementations, the ARM generator 320 selects one or more function IDs 140 on which to base the ARM 110. The ARM generator 320 may score each function ID 140 based on the fee arrangement, one or more features relating to the state of the application indicated by the function ID 140, one or more features of the context category structure 130, and/or one or more features of the function ID 140 as it relates to the context category structure 130. The ARM generator 320 can select the function IDs 140 based on the respective scores thereof. For each selected function ID 140, the ARM generator 320 may generate an advertisement object 112 corresponding to the selected function ID. The ARM generator 320 includes the generated advertisement objects 112 in an ARM 110 and may transmit the ARM 110 to the user device 200 (or an intermediate device that transmits the ARM 110 to the user device 200).

In some implementations, the ARM generator 320 scores each received function ID 140. The ARM generator 320 may utilize any suitable scoring techniques to score a function ID 140. In some implementations, the ARM generator 320 calculates an expected value of the function ID 140 and the score of the function ID 140 is based on the expected value. The expected value of a function ID 140 may be calculated according to the fee arrangement corresponding to the function ID 140. If the function ID 140 is generated by the rules-based ad generator 316, the fee arrangement 372 is defined in the app-specific rule 362 used to generate the function ID 140. If the function ID 140 is identified from an advertisement record 342, the fee arrangement 348 is defined in the advertisement record 342. The fee arrangement defines a price-per-action (e.g., price-per-impression, price-per-click, or price-per-purchase). The expected value of the function ID 140 can be determined according to a probability that the action occurs (e.g., probability of a click, impression, or purchase) multiplied by the agreed upon monetary value. The probability of an impression is 1.0. The probability of the other actions may be determined using historical data that may or may not be domain specific. In some implementations, the advertising system 300 may keep track of user interaction with advertisements pertaining to different categories. For each category, the advertising system 300 may determine a probability of an action. For example, the advertising system 300 may keep track of the probability of an ad pertaining to a "watch a movie" category being clicked as well as a probability of an ad pertaining to a "purchase plane tickets" category being clicked. Thus, for each function ID, the advertising system 300: i) determines the fee arrangement; ii) determines a probability of an action defined in the fee arrangement occurring; and iii) determines a score (e.g., expected value) based on the probability and the agreed upon cost-per-action.

In other implementations, the ARM generator 320 determines the score of a function ID using a machine learned scoring model. In these implementations, the ARM generator 320 may determine a feature vector for each function ID 140. The ARM generator 320 may feed the feature vector into a machine learned scoring model. Examples of a machine learned scoring model include gradient boosted decision trees. In these implementations, the scoring model outputs a score of the function ID 140 based on the feature vector and previously learned data. The feature vector may include the fee arrangement, one or more state features relating to function ID 140 or the state of the application indicated by the function ID 140, one or more category features of the context category structure 130, and/or one or more state/category features of the function ID 140 as it relates to the context category structure 130. The state features may relate to the function ID 140 or the state indicated by the function ID 140. These features may be a popularity of the state of the application or the popularity of the application. The category features may relate to the context category structure 130 used to determine the function ID 140. These features may include the category score defined in the context category structure 130, how often ads corresponding to the category identified in the context category structure 130 are selected, and a popularity of the category. The state/category features of the function ID 140 may relate to the function ID 140 or the state indicated by the function ID 140 in view of the context category structure 130. For instance, the features may include how many entity types defined in the context category structure 130 matched the entity types defined in the triggering data and how many entities were used to generate a function ID 140 (when the function ID is generated by the rules-based ad generator). The foregoing are non-limiting examples of features that may be included in a feature vector. In the event a particular feature is not applicable to a function ID 140, the value of the feature may be set to a null value in the feature vector. For example, if a function ID 140 was obtained from an advertisement record 342, a feature relating to function IDs generated according to an app-specific rule may be set to null.

The ARM generator 320 can determine a feature vector for each of the function IDs 140. The ARM generator 320 can feed the feature vector to the machine learned model. The machine learned model outputs a score of the function ID 140 based on the feature vector. As previously mentioned, the machine learned model can be trained using data collected over time in a supervised, semi-supervised, or unsupervised manner.

The ARM generator 320 can rank the scored function IDs 140 according to their respective scores. The ARM generator 320 can then select N function IDs 140, where N is an integer greater than or equal to one. The value of N may be provided in the ad request or may be a default value. For each of N selected function IDs 140, the ARM generator 320 generates an advertisement object 112 based on the function ID 140.

To generate an advertisement object 112, the ARM generator 320 can instantiate a new advertisement object 112. The ARM generator 320 can retrieve an advertisement object template and may instantiate the new advertisement object 112 from the advertisement object template. The new advertisement object includes fields that receive specific types of data. For example, each advertisement object 112 may include a title field, an access mechanism field, a description field, an image field, and fields that receive various types of metadata.

In the case of a function ID 140 generated from an app-specific rule 362, the ARM generator 320 can populate the fields with data corresponding to the application or contained in the app-specific rule. In the latter scenario, the app-specific rule 362 may further include ad content. The ad content may indicate a name of the application and an icon of the application. The ad content may additionally include a generic description directed to the action that can be performed at the state. For instance, the app-specific rule 362 may pertain to a movie ticket application. In such an example, the generic description may be "purchase tickets to the hottest new movies." In this way, the description may be used in advertisements that link to the ticket purchasing feature of the application, regardless of the state (e.g., a state corresponding to a specific movie title and location) that is linked to by the generated function ID. The ARM generator 320 may obtain the ad content from the app-specific rule 362 and may populate the new advertisement object with the ad content.

Furthermore, in the case that a function ID is generated based on an app-specific rule 362, the ARM generator 320 may generate one or more access mechanisms based on the function ID. In some implementations, the ARM generator 320 utilizes a referencing schema of each advertised application. The referencing schema of an application can define the manner by which a function ID is translated from a function ID to the various types of access mechanisms that can be used to access the application. In some scenarios, the referencing schema is a custom schema. The custom schema of an application can define the structure of the different access mechanisms and the manner by which the parameter values of a parameterized function ID are translated into values that are accepted by the application via the access mechanisms. The ARM generator 320 translates the function ID into one or more access mechanisms based on the referencing schema corresponding to the application. The ARM generator 320 may generate multiple access mechanisms if the ad request did not specify a platform of the user device and/or a list of native application editions installed on the user device. In such a scenario, the ARM generator 320 may generate access mechanisms that include a web resource identifier and one or more application resource identifiers, whereby each application resource identifier is configured for a different native application edition. The ARM generator 320 can include the generated access mechanisms in the new advertisement object.

In the case that a function ID is obtained from an identified advertisement record 342, the ARM generator 320 may populate the new advertisement object 112 using information contained in the advertisement record 342. The ARM generator 320 may obtain the ad content 346 from the advertisement record 342 and may populate the title field, image field, and/or description field from the ad content 346. The ARM generator 320 may obtain the access mechanisms 345 from the application record 342 as well. The ARM generator 320 may populate the access mechanism field(s) of the new advertisement object with the access mechanism(s) obtained from the application record 342.

The ARM generator 320 may generate the ARM based on the generated advertisement objects. The ARM generator 320 may order the advertisement objects 112 in the ARM 110 according to the scores of the respective function IDs 140. In some scenarios, an ARM 110 may only contain one advertisement object 112. In other scenarios, the ARM 110 may contain multiple advertisement objects 112, each advertisement object corresponding to a different advertisement. The ARM generator 320 may encode the ARM 110 in a container such as an iFrame or a .json file (or an analogous format). The ARM generator 320 may communicate the container (i.e., the encoded ARM 110) to the user device 200. Communicating the container to the user device 200 may include communicating the container to an intermediate device, which in turn communicates the container to the user device 200.

Figure 4:
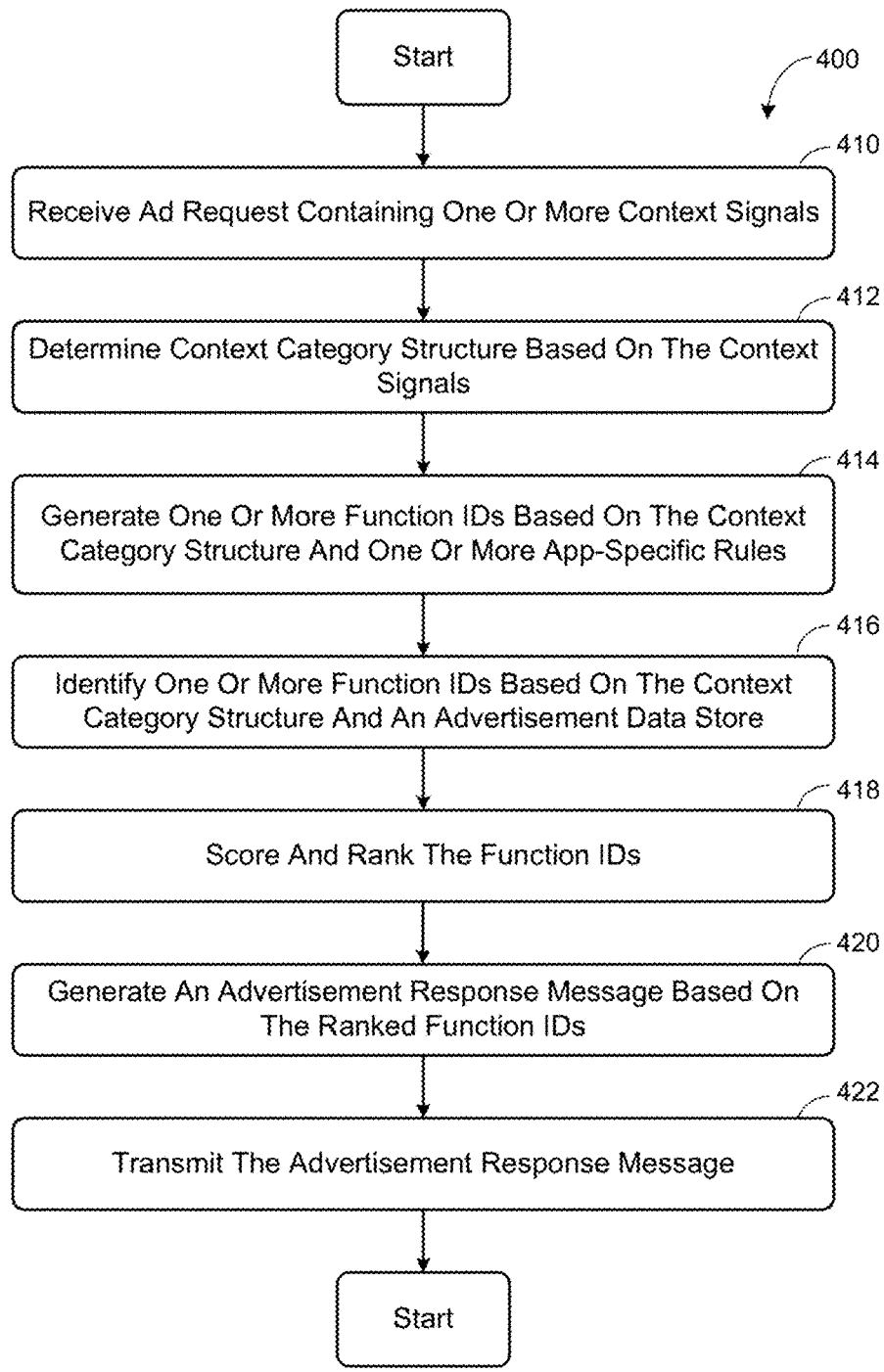
FIG. 4 is a flow chart illustrating an example set of operations of a method for providing an advertisement response message to a user device.

FIG. 4 illustrates an example set of operations of a method 400 for generating an ARM 110. The method 400 is described with respect to the advertising system 300 of FIGS. 3A-3E. The method 400 may be performed by other suitable systems as well.

At operation 410, the advertising system 300 receives an ad request 120 containing one or more context signals 122. The ad request 120 may be received from a user device 200 or an intermediate device communicating with a user device 200. In the latter scenario, the ad request 120 is still received from a user device 200, albeit not directly. The context signals 122 may include a location of the user device 200, a state of an application being accessed by the user device, keywords corresponding to the state of the application, and/or a user profile of the user. The context signals 122 may include additional or alternate signals as well.

At operation 412, the context categorizer 314 determines a context category structure based on the context signals 122. The context category structure is a data structure that indicates a category, a probability that the user is interested in the category, one or more entities, and/or one or more entity types of the entities. The context categorizer 314 can utilize a knowledge base 350 to determine the context category structure.

In some implementations, the context signals 122 include keywords representing the state of an application being accessed or recently accessed by the user device 200. The keywords may be determined by scraping the state of the application. In some implementations, the user device 200 scrapes the state of the application (e.g., a document) and identifies the keywords corresponding to the state of the application. In other implementations, the context signals 122 include an access mechanism representing the state of the application (e.g., a URL). In such scenarios, the context categorizer 314 can request a document from a resource using the access mechanism and may scrape the document. The result of the scraping produces the keywords.

The context categorizer 314 can utilize the keywords and/or other context signals to identify the category, entities, and entity types. The context categorizer 314 can query one or more inverted indexes with the context signals. For example, the context categorizer 314 may query an inverted index that indexes categories with a location, a time range, and/or one or more keywords to identify a context category. The inverted index may output an identifier of the category. In some implementations, the inverted index may also output a probability associated with a category identifier, whereby the probability is a value indicating a likelihood that the user is interested in the category given the context signals 122. The probability can be calculated off-line or at query time. The probability may be based on historical data learned from previous user behaviors.

The context categorizer 314 may further query an inverted index that indexes entities using the keywords and/or other context signals (e.g., location). The inverted index receives a keyword and outputs one or more entity types of the keyword. The combination of the keyword, or an identifier of the keyword, and the entity type indicates the entity. For example, the combination of JFK and airport code entity type indicates that the keyword represents the John F. Kennedy International Airport and not the former president. The context categorizer 314 includes the category and entity in the context category structure 130. The context categorizer 314 may include additional information in the context category structure 130 as well.

At 414, the rules-based ad generator 316 generates one or more function IDs 140 based on the context category structure 130. The rules-based ad generator 316 utilizes one or more app-specific rules 362 to generate the function IDs. The app-specific rules 362 are stored in a rules data store 360 and may be indexed by category in an inverted index. The rules-based ad generator 316 queries the inverted index using the category indicated in the context category structure. The inverted index outputs the app-specific rules 362 that pertain to the category. Each app-specific rule 362 may identify the entity types it receives. Thus, the rules-based ad generator 316 can determine whether an app-specific rule is pertinent to the context category structure based on the entity types identified therein. If not, a non-pertinent app-specific rule is discarded. Otherwise, the rules-based ad generator 316 uses the app-specific rule 362 to generate a function ID 140. The rules-based ad generator 316 can feed one or more entities into the app-specific rule 362, which defines a manner by which a function ID is generated using a set of particular entity types. The rules-based ad generator 316 determines which entities to use based on the entity types of the entities and the entity types received by a particular app-specific rule 362. Each rule 362 may produce one or more function IDs 140. The outputted function IDs 140 and data pertaining to the function IDs 140 (e.g., which rule 362 was used to generate the function ID 140 and which entities were used to generate the function ID 140) may be output to the ARM generator 320.

At 416, the ad selector 318 selects one or more function IDs 140 from an advertisement data store 340 based on the context category structure. The ad selector 318 searches the advertisement data store 340 using the category indicated in the context category structure 130 and one or more of the keywords or entities indicated in the context category structure 130. In some implementations, the ad selector 318 queries an inverted index that indexes advertisement records 342 using a combination of a category and one or more entities and/or keywords. The inverted index outputs function IDs of advertisement records 342 that include the combination used to query the inverted index in the triggering data 348. The ad selector 318 may use different combinations of category and keywords or entities. The ad selector 318 may output the identified function IDs 140 to the ARM generator 320.

At 418, the ARM generator 320 scores and ranks the function IDs 140 received from the rules-based ad generator 316 and/or the ad selector 318. In some implementations, the ARM generator 320 scores the function IDs (received from the rules-based ad generator 316 and/or the ad selector 318) based on a respective expected value of each function ID. In these implementations, the ARM generator 320 can calculate the expected value based on a fee arrangement associated with the function ID and a probability associated with the fee arrangement. For example, in the case of a function ID generated from an app-specific rule 362, the fee arrangement may 370 may be defined in the app-specific rule 362 and may define a cost-per-action. The probability used to calculate the expected value is the probability of the action defined in the fee arrangement actually occurring. Similarly, an advertisement record 342 includes a fee arrangement 348 that includes a cost-per-action. In this way, the expected value of a function ID selected from the advertisement data store 340 is based on the product of the price-per-action and the probability of that action occurring.

In some implementations, the ARM generator 320 scores the function IDs 140 by generating a feature vector for each function ID 140. The ARM generator 320 may determine a feature vector for each function ID and may feed the feature vector into a machine learned scoring model. The machine learned scoring model outputs a score for each received feature vector. The score of a function ID may be indicative of a relevance of the state indicated by the function ID given the context category structure. Additionally, the score may be indicative of the expected value of the advertisement indicated by the function ID. For example, a slightly less relevant function ID may receive a higher score than a more relevant function ID, if the price-per-action of the less relevant function ID outweighs the relevance of the function ID. The machine-learned scoring models may be trained using data collected from previous users interactions with previously presented advertisements given the context signals corresponding to the previous users. In these implementations, the scoring model outputs a score of the function ID based on the feature vector and the previously learned data.

As previously indicated, a feature vector may include the fee arrangement, one or more state features relating to function ID 140 or the state of the application indicated by the function ID, one or more category features of the context category structure, and/or one or more state/category features of the function ID 140 as it relates to the context category structure 130. In the event a particular feature is not applicable to a function ID 140, the value of the particular feature may be set to a null value in the feature vector. For example, if a function ID 140 is generated from an app-specific rule 362, a value of a feature relating to function IDs 140 obtained from an advertising record 342 may be set to null. For each function ID 140, the ARM generator 320 may determine the score of the function ID 140 based on its corresponding feature vector and the machine-learned scoring model.

The ARM generator 320 can rank the scored function IDs based on the scores. In this way, the ARM generator 320 can select the function IDs on which the ARM 110 is generated.

At 420, the ARM generator 320 generates the ARM 110 based on the scored function IDs 140. The ARM generator 320 selects N of the scored function IDs 140 based on their respective rankings. The value of N may be defined in the ad request 120 or may be a default value. N indicates the number of advertisements that are to be displayed at the user device 200.

The ARM generator 320 generates the ARM 110 based on the N selected function IDs. For each selected function ID, the ARM generator 320 creates an advertisement object 112 and inserts the advertisement object 112 in the ARM 110. As previously discussed, the ARM generator 320 can instantiate a new advertisement object 112 for each function ID 140. The ARM generator 320 can retrieve an advertisement object template and may instantiate the new advertisement object from the template. The new advertisement object includes fields that receive specific types of data. For example, each advertisement object may include a title field, an access mechanism field, a description field, an image field, and fields that receive various types of metadata.

In the case of a function ID generated from an app-specific rule 362, the ARM generator 320 can populate the fields with data corresponding to the application in general and/or ad content contained in the app-specific rule. The ARM generator 320 may include a name of the application and/or an icon of the application in the advertisement object. The ARM generator may additionally include a generic description directed to the action that can be performed at the state in the advertisement object. As discussed above, the ARM generator 320 may also generate one or more access mechanisms based on the function ID and a referencing schema of the application linked to by the advertisement. The ARM generator 320 may include the one or more access mechanisms in the advertisement object 320.

In the case that a function ID 140 is obtained from an identified advertisement record 342, the ARM generator 320 may populate the new advertisement object using information contained in the advertisement record 342. The ARM generator 320 may obtain the ad content 346 from the advertisement record and may populate the title field, image field, and/or description field from the ad content 346. The ARM generator 320 may obtain the access mechanisms 345 from the application record 342 as well. The ARM generator 320 may populate the access mechanism field(s) of the new advertisement object with the access mechanism(s) obtained from the application record 342.

The ARM generator 320 may generate the ARM 110 based on the generated advertisement objects 110. The ARM generator 320 may instantiate a new ARM 110 from an ARM template. The ARM generator can include the advertisement objects in the new ARM 110. The ARM generator 320 may encode the ARM 110 in a container such as an iFrame or a son file (or an analogous format).

At 422, the ARM generator 320 transmits the ARM 110 to the user device 200. The ARM generator 320 may communicate the container (i.e., the encoded ARM) to the user device 200. Communicating the container to the user device 200 may include communicating the container to an intermediate device, which in turn communicates the container to the user device.

The method 400 of FIG. 4 may be altered without departing from the scope of this disclosure. For instance, in some implementations the advertising system 300 does not search the advertisement data store 340. In these implementations, the advertising system 300 generates function IDs using the app-specific rules 362 but does not select function IDs from the advertisement data store 340. The method 400 may be altered in other suitable manners as well.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An advertising apparatus comprising:
   at least one processor; and
   at least one memory communicatively coupled to the at least one processor and configured to store a plurality of app-specific rules,
   wherein the memory stores one or more computer programs including instructions which, when executed by the at least one processor, cause the at least one processor configured to:
      in response to receiving at least one context signal for an advertising request, determine a context category structure based on the ad request received at least one context signal,
      identify at least one app-specific rule of the plurality of app-specific rules based on a category of an application or an application function corresponding to the context category structure,
      generate function identifiers (IDs) related to the application based on a set of entities and a template corresponding to the at least one app-specific rule,
      determine a score for each of the generated function IDs based on a fee arrangement corresponding to the at least one app-specific rule,
      select at least one function ID among the generated function IDs based on respective scores of the generated function IDs,
      generate an advertisement object corresponding to the selected at least one function ID, and
      transmit the generated advertisement object to a user device, wherein the determining of the context category structure includes:
         determining a set of keywords corresponding to a current state of the application being presented by the user device based on the at least one context signal,
         determining the category based on the set of keywords and a knowledge base, and
         determining the set of entities based on the set of keywords and the knowledge base,
      wherein the at least one context signal includes a resource identifier indicating the current state of the application,
      wherein the determining of the set of keywords includes:
         in response to requesting a document corresponding to the current state using the resource identifier,
         obtaining the document from a resource, and
         scraping the document to identify the set of keywords, and
      wherein the each app-specific rule includes triggering data, the template, and a set of entity types.

2. The advertising apparatus of claim 1,
   wherein the memory further stores a knowledge data store that stores the knowledge base, the knowledge base relating a plurality of keywords to one or more respective categories, the knowledge base further relating the plurality of keywords to one or more entities, each entity having at least one entity type, and
   wherein the set of keywords are included in the at least one context signal.

3. The advertising apparatus of claim 1,
   wherein the processor identifies any app-specific rules in the at least one memory with triggering data that matches the category corresponding to the context category structure, and
   wherein the processor, to determine that entities in the context category structure are received by the template, compares the entity types corresponding to the app-specific rule match the entity types of the entities defined in the context category structure.

4. The advertising apparatus of claim 1, wherein the processor, to determine the score of each of the generated function IDs, determines an expected value of an advertisement corresponding to each of the generated function IDs based on the fee arrangement and a probability of an action corresponding to the fee arrangement occurring.

5. The advertising apparatus of claim 1, wherein the memory includes a rule data store storing the plurality of app-specific rules and an advertisement data store that stores a plurality of advertisement records, each advertisement record including a function ID, ad content, one or more access mechanisms corresponding to the function ID, and triggering data.

6. The advertising apparatus of claim 5, wherein the processor is further configured to:
   identify the advertisement records in the memory having triggering data that matches the category and entities corresponding to the context category structure, thereby identifying the function IDs of the matched advertisement records, and
   generate the score for each of the identified function IDs.

7. A method comprising:
   in response to receiving at least one context signal for an advertising request, determining, by a processor of an advertising apparatus, a context category structure based on the received at least one context signal;
   identifying, by the processor, at least one app-specific rule based on a category of an application or an application function corresponding to the context category structure;
   generating, by the processor, function identifiers (IDs) related to the application based on a set of entities and a template corresponding to the at least one app-specific rule, determining, by the processor, a score for each of the generated function IDs based on a fee arrangement corresponding to the at least one app-specific rule, and selecting, by the processor, at least one function ID among the generated function IDs based on respective scores of the generated function IDs;

generating, by the processor, an advertisement object corresponding to the selected at least one function ID; and transmitting, by the processor, the generated advertisement object to a user device, wherein the determining of the context category structure includes:

determining a set of keywords corresponding to a current state of a application being presented by the user device based on the at least one context signal, determining the category based on the set of keywords and a knowledge base, and determining the set of entities based on the set of keywords and the knowledge base, wherein the at least one context signal includes a resource identifier indicating the current state of the application, wherein the determining of the set of keywords includes:

in response to requesting a document corresponding to the current state of the application using the resource identifier, obtaining the document from a resource, and scraping the document to identify the set of keywords, and wherein the each app-specific rule includes triggering data, the template, and a set of entity types.

8. The method of claim 7, further comprising maintaining, by the processor, a knowledge data store that stores the knowledge base in a memory, the knowledge base relating a plurality of keywords to one or more respective categories, the knowledge base further relating the plurality of keywords to one or more entities, each entity having at least one entity type, wherein the set of keywords are included in the at least one context signal.

9. The method of claim 7, wherein identifying the one or more app-specific rules includes identifying any app-specific rules in a memory with triggering data that matches the category corresponding to the context category structure.

10. The method of claim 9, further comprising determining whether entities in the context category structure are received by the template includes comparing the entity types corresponding to the app-specific rule match the entity types of the entities corresponding to the context category structure.

11. The method of claim 7, wherein determining the score of each of the generated function IDs includes determining an expected value of an advertisement corresponding to each of the generated function IDs based on a fee arrangement corresponding to the app-specific rule and a probability of an action corresponding to the fee arrangement occurring.

12. The method of claim 7, further comprising controlling to store a plurality of advertisement records in an advertisement data store of a memory, each advertisement record including a function ID, ad content, one or more access mechanisms corresponding to the function ID, and triggering data.

13. The method of claim 12, further comprising:

identifying the advertisement records in the advertisement data store having the triggering data that matches the category and entities corresponding to the context category structure, thereby identifying the function IDs of the matched advertisement records; and generating the score for each of the identified functions IDs.

14. An advertising apparatus comprising:

at least one processor; and at least one memory communicatively coupled to the at least one processor, wherein the memory stores one or more computer programs including instructions which, when executed by the at least one processor, cause the at least one processor configured to:

in response to an advertising request by a user device, obtain information related to at least one application currently executed by the user device or currently accessed at the user device, identify at least one keyword corresponding to a current state of the at least one application based on the information related to the at least one application, identify a category of the at least one application using the identified at least one keyword, obtain at least one function identifier based on the category and the at least one keyword, set a score of the least one function identifier based a fee arrangement corresponding to the at least one function identifier, when the at least one function identifier is selected based on the set score, obtain an advertisement corresponding to the current state of the at least one application based on the at least one function identifier, and control to transmit the obtained advertisement to the user device, wherein the at least one function identifier is generated based on the at least one keyword and an app-specific rule for the at least one application related to the category.

15. The advertising apparatus of claim 14, wherein the at least one processor further configured to determine a context category structure including the category, at least one entity corresponding to the keyword, and a entity type indicating a type of the at least one entity, and wherein the context category structure is used to generate or identify the function identifier.

16. The advertising apparatus of claim 14, wherein the at least one memory is configured to store a plurality of app-specific rules, and wherein each of the app-specific rules defines triggering data, a template, and a set of entity types received by the template, the template being used to generate the function identifier based on received entities of the entity types.

17. A method, by a processor of an advertising apparatus, comprising:

in response to an advertising request by a user device, obtaining information related to at least one application currently executed by the user device or currently accessed at the user device;

identifying at least one keyword corresponding to a current state of the at least one application based on the information related to the at least one application;

identifying a category of the at least one application using the identified at least one keyword;

obtaining at least one function identifier based on the category and the at least one keyword;

setting a score of the least one function identifier based a fee arrangement corresponding to the at least one function identifier;

when the at least one function identifier is selected based on the set score, obtaining an advertisement corresponding to the current state of the at least one application based on the at least one function identifier; and controlling to transmit the obtained advertisement to the user device, wherein the at least one function identifier is generated based on the at least one keyword and an app-specific rule for the at least one application related to the category.

18. The method of claim 17, further comprising determining a context category structure including the category, at least one entity corresponding to the keyword, and a entity type indicating a type of the at least one entity, wherein the context category structure is used to generate or identify the function identifier.

19. A non-transitory computer-readable storage medium storing instructions that, when executed, cause at least one processor to perform a method for operating an electronic device, the method comprising:

in response to an advertising request by a user device, obtaining information related to at least one application currently executed by the user device or currently accessed at the user device;

identifying at least one keyword corresponding to a current state of the at least one application based on the information related to the at least one application;

identifying a category of the at least one application using the identified at least one keyword;

obtaining at least one function identifier based on the category and the at least one keyword;

setting a score of the least one function identifier based a fee arrangement corresponding to the at least one function identifier;

when the at least one function identifier is selected based on the set score, obtaining an advertisement corresponding to the current state of the at least one application based on the at least one function identifier; and controlling to transmit the obtained advertisement to the user device, wherein the at least one function identifier is generated based on the at least one keyword and an app-specific rule for the at least one application related to the category.

* * * * *